UNITED STATES PATENT OFFICE.

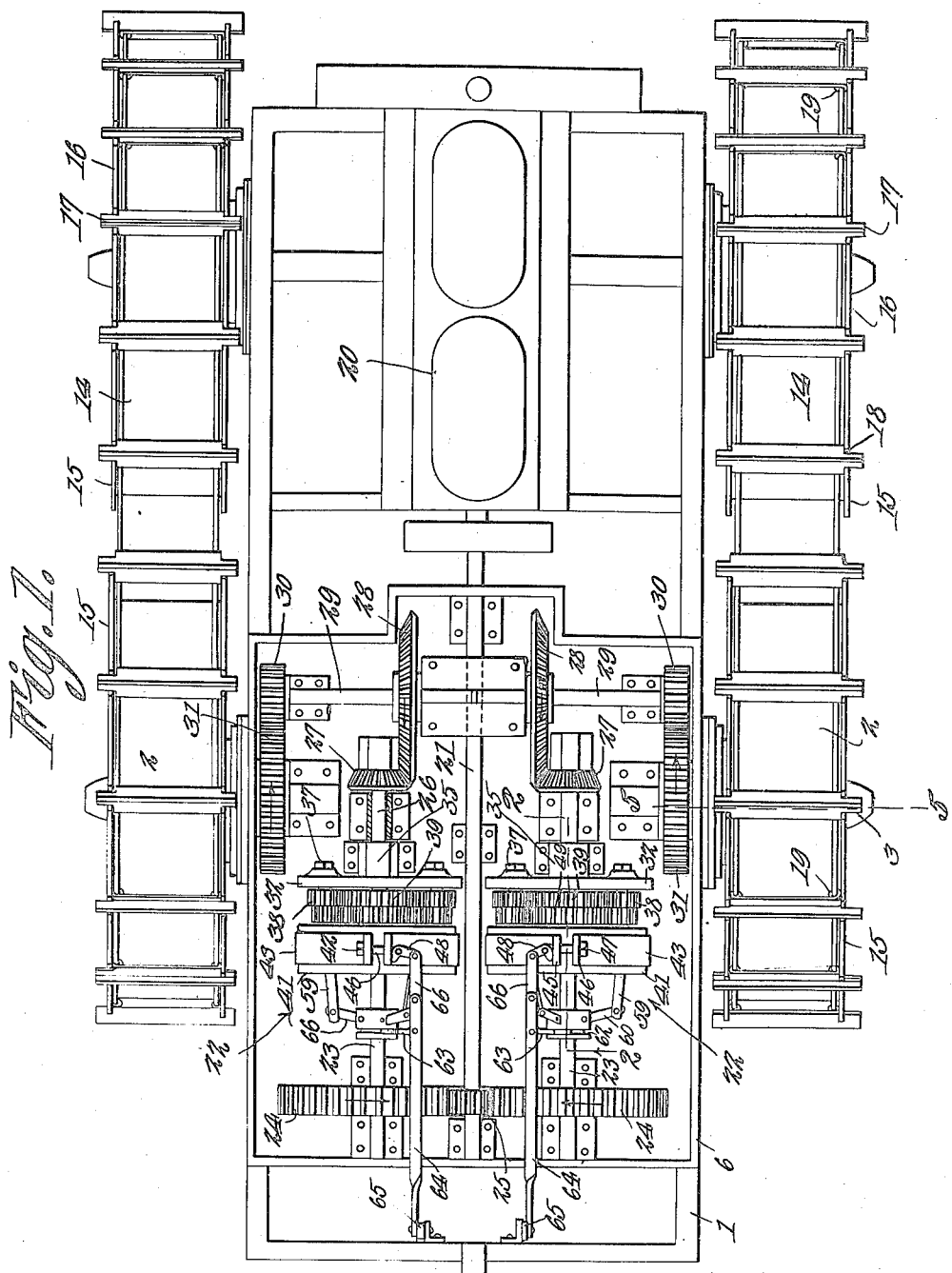

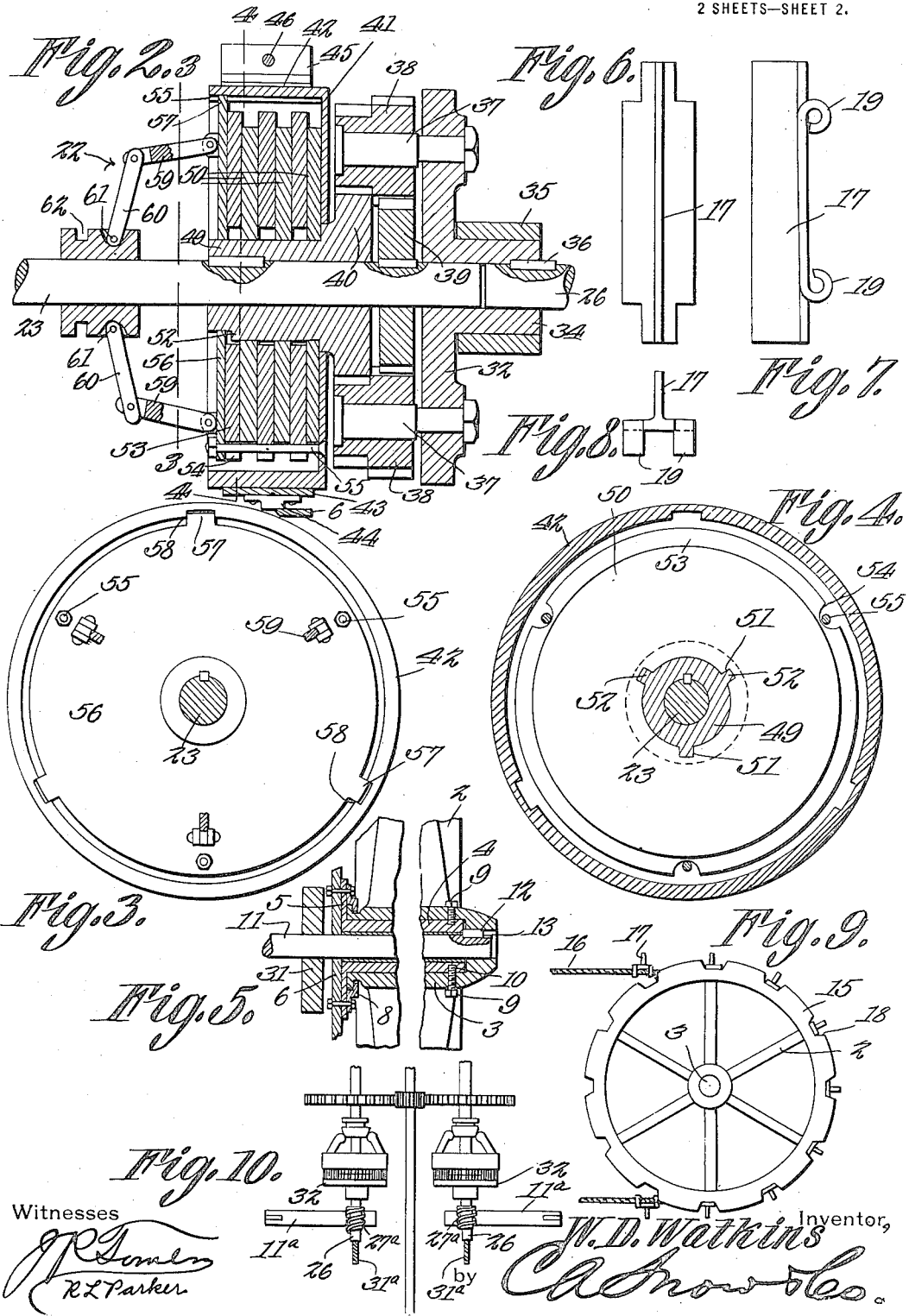

WILLIAM D. WATKINS, OF SAN JOSE, CALIFORNIA, ASSIGNOR OF ONE-HALF TO HARRY W. CONKLING, OF SAN JOSE, CALIFORNIA.

TRACTOR.

1,222,911.	Specification of Letters Patent.	Patented Apr. 17, 1917.

Application filed February 10, 1916. Serial No. 77,482.

*To all whom it may concern:*

Be it known that I, WILLIAM D. WATKINS, a citizen of the United States, residing at San Jose, in the county of Santa Clara and State of California, have invented a new and useful Tractor, of which the following is a specification.

The present invention appertains to tractors, and aims to provide a novel and improved agricultural tractor which is useful for pulling a plow, cultivator, harrow, and the like, and which will be generally useful for agricultural or industrial purposes.

It is the object of the invention to provide a tractor having novel and improved means for propelling it upon the ground, and for steering and turning the tractor around, the machine having independent driving means at its opposite sides which can be operated independently in either direction, to control the movements of the tractor as desired.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the improved tractor, portions being broken away and shown in section.

Fig. 2 is an enlarged sectional view taken on the line 2—2 of Fig. 1, with portions arranged at a different angle than illustrated in Fig. 1 to illustrate them more clearly.

Figs. 3 and 4 are cross sections taken on the respective lines 3—3 and 4—4 of Fig. 2.

Fig. 5 is a sectional detail taken on the line 5—5 of Fig. 1.

Fig. 6 is a plan view of one of the tractor members.

Fig. 7 is an elevation of said tractor member.

Fig. 8 is an end view of the tractor member.

Fig. 9 is a reduced elevation of one of the driving wheels and a portion of the corresponding belt.

Fig. 10 is a plan view illustrating a modification.

The tractor has a suitable frame 1, and a pair of traction wheels 2 at its opposite sides and adjacent its rear end. Each of the wheels 2 has its hub 3 journaled for rotation upon a tubular spindle 4 outstanding from the frame and provided at its inner end with an annular outturned flange 5 bolted or otherwise secured to the respective side of the gear case 6. The inner end of the hub 3 of each wheel is engaged by an annular plate or ring 8 bolted or otherwise fastened to the flange 5, whereby said ring 8 holds the hub in place upon the spindle. Retaining screws 9 are also carried by the hub 3 and project inwardly to work in an annular groove 10 with which the spindle 4 is provided, to assist in holding the hub in place. The wheels 2 are driven by short alining shafts 11 journaled through the spindles 4, the outer ends of the hubs 3 being contracted, as at 12, and keyed or secured, as at 13, to the outer ends of the shafts 11.

The forward end of the frame is supported by a pair of front wheels 14 at the opposite sides of the frame in front of the rear wheels 2, and of the same construction as the rear wheels, and mounted for rotation in practically the same manner. All of the ground wheels are provided with channel-shaped rims having the outturned side flanges 15. Endless tractor belts are trained around the wheels at the opposite sides, and each embodies a pair of endless flexible wire cables 16 running upon the rims of the wheels between and adjacent the flanges thereof. Spaced transverse tractor members 17 formed of T-iron are secured upon the cables 16 of each pair and have their flanges resting against and attached to the cables while the webs project outwardly to engage the ground to increase the traction effort. The flanges 15 of the wheels are notched, as at 18, for the reception of the ends of the cross T-irons or tractor members 17, and the belts will thus be driven positively when the rear wheels 2 are rotated. The wheels 2 and 14 are in the nature of sprocket wheels, and the belts are in the form of endless sprocket chains trained therearound, although the wheels are of drum form and the belts are relatively wide so as to have a considerable bearing surface upon the ground for supporting the tractor even in soft ground. The tractor is of the caterpillar type, the traction belts serving to propel the tractor instead of relying upon the wheels themselves, and which provides for a more positive propulsion of the machine. The tractor members 17 can be secured in various manners to the cables 16, and as a convenient and effective means for accomplishing this result, the ends of the flanges of the members 17 can be split and bent or coiled back to provide eyes 19 tightly embracing and gripping the cables 16, to hold the members 17 securely in position.

The tractor is propelled by an internal combustion engine or any suitable prime mover 20 carried by the frame 1, and operating a driving shaft 21 which projects rearwardly into the gear case 6. The case 6 incloses a pair of independent transmission mechanisms 22 at the opposite sides of the driving shaft 21 and connecting the said shaft with the wheel shafts 11. Each of the mechanisms 22 embodies a rear longitudinal shaft 23 mounted for rotation within the case 6, and having keyed thereon a relatively large gear wheel 24, the two gear wheels 24 meshing with one another, and one of them meshing with a pinion 25 keyed upon the driving shaft 21, so that both shafts 23 are operated when the shaft 21 is rotated. Each of the mechanisms 22 also has a forward longitudinal shaft 26 alining with the shaft 23, and a bevel pinion 27 is keyed to the forward end of the shaft 26 and meshes with a bevel gear wheel 28 keyed upon a transverse counter shaft 29, the two counter shafts 29 being in alinement in front of the shafts 11. The shafts 29 are journaled within the case 6, and have keyed to their remote ends spur gears 30 meshing with larger spur gears 31 keyed upon the shafts 11 adjacent the inner ends thereof and within the case 6. The shafts 26 are thus continually connected with the drive wheels 2.

Each of the transmission mechanisms 22 embodies means for operating the shaft 26 in opposite directions from the shaft 23. Thus, a disk 32 is provided with a hub 34 receiving the adjacent ends of the shafts 23 and 26, and the hub 34 is journaled in a suitable bearing 35. The hub 34 is keyed, as at 36, to the shaft 26, and the disk 32 has outstanding pintles 37 upon which are journaled doubled diametered pinions 38. A spur gear 39 is keyed upon the shaft 23 and meshes with the pinions 38 adjacent the disk 32, and another spur gear 40 is mounted loosely upon the shaft 23 adjacent the gear 39 and meshes with the pinions 38 also. A wheel 41 is secured to the gear 40 and has an annular rim 42 projecting away from the disk 32 and its pinions 38, and a brake band 43 surrounds the rim 42 and is adapted to grip the same. The lower portion of the brake band 43 is secured, as at 44, to the bottom of the case 6, and the brake band is split at the top and is provided at its ends with upstanding ears 45 through which a bolt 46 is passed. Said bolt 46 has a head 47 at one end bearing against one ear 45, and a bell crank lever 48 is pivoted to the other end of the bolt to bear against the other ear, whereby said bell crank lever or cam 48 can be swung for forcibly moving the ends of the brake band together to cause the brake band to grip and hold the wheel 41. The wheel 41 incloses a clutch for connecting the wheel positively with the shaft 23 when desired, and to this end a sleeve 49 is keyed upon the shaft 23 within the rim 42 of the wheel 41. A plurality of parallel friction disks 50 are mounted slidably upon the sleeve 49 and have notches 51 at their inner edges engaging the longitudinal splines 52 of the sleeve 49, to hold the disks 50 against rotation relative to the shaft 23, but to allow said disks to shift longitudinally when compelled to do so. Alternated with the disks 50 are friction disks 53 of slightly larger diameter and mounted loosely upon or around the sleeve 49. These disks 53 are constrained to rotate with the wheel 41, but can shift longitudinally with the disks 50. Thus, the peripheries of the disks 53 are provided with notches 54 through which longitudinal bolts or rods 55 extend to prevent the rotation of the disks 53 relative to the wheel 41, but to permit said disks to shift longitudinally. The bolts 55 are engaged through the wheel or disk 41, and through a closure or clamping disk 56 fitted within the edge portion of the rim 42. The bolts 55 can be tightened to hold the disks 50—53 together with the desired tension under normal conditions, but without compelling the wheel 41 to rotate with the shaft 23. The periphery of the disk 56 has lugs 57 working in longitudinal grooves 58 with which the rim 42 is provided, and links 59 are pivoted to the outer side of the disk 56 and to outstanding arms 60 carried by a collar 61 which is journaled loosely upon the shaft 23, and which has an annular groove 62 engaged by an arm 63 of a shifter bar 64. Said bars 64 of the two devices are connected to levers or other operating members 65 carried by the rear end of the frame 1 adjacent the operator's seat S, whereby said levers can be conveniently manipulated. The cams 48 are connected by links 66 with the bars 64, in order that the clutch and brake devices will be operated alternately.

In operation, supposing the engine 20 to be in action whereby the shafts 23 are rotated in the directions of the arrows on the gear wheels 24, when the operator desires to move forward, the levers 65 are swung forward. This will swing the cams 48 to such positions that the brake bands 43 are released from the rims 42, allowing the wheels 41 to rotate without interference, and at the same time, the collars 61 are shifted forward and through the medium of the links 59 will force the disks 56 farther into the rims 42, thus pressing the friction disks 50 and 53 together, and increasing the friction therebetween, so that there is a tendency for the disks 53 being rotated with the disks 50, and as a consequence, the wheels 41 will be rotated by the shafts 23. The gears 40 will therefore be rotated with the shafts 23, the same as the gears 39, and since the pinions 38 cannot rotate relative to both gears 39—40 of each pair, the disks 32 will be rotated with the gears 38—39—40, and the shafts 26 will therefore be rotated with and in the same direction as the shafts 23. The driving wheels 2 are therefore rotated in the proper direction for propelling the machine forward. To stop the machine, the levers 65 are moved to neutral or intermediate positions, whereby the clutches are released to disconnect the wheels 41 from the shafts 23, the brake bands 43 also being released, so that the connection between the shafts 23 and 26 are broken. To reverse the movement of the tractor, the levers 65 are pulled rearward, releasing the clutches, and swinging the cams 48, so that the brake bands 43 are applied for stopping the movement of the wheels 41. The gears 40 are thus held stationary, while the gears 39 are rotated. The gears 39 will rotate the pinions 38 which in meshing with the gears 40, will rotate the disks 32 in a direction opposite to the direction of rotation of the shafts 23. Consequently, the shafts 26 will be rotated in a reverse direction for rotating the wheels 2 likewise, and the machine will therefore move backwardly. The two opposite transmission devices are independent, in order that the belts at the opposite sides can be operated independently. Thus, for purpose of steering, one belt can be disconnected from the driving medium, while the other is operated for steering or turning the machine toward the opposite side, and to facilitate steering, the opposite belts can be actuated in opposite directions. This also enables the machine to be turned around within small space, and practically about a center coinciding with the center of the tractor.

The wheels 14 are idlers, assisting in supporting the tractor, and the traction belts, while the wheels 2 are the drivers.

The tractor can be employed for agricultural and other purposes, as will be apparent, and when the transmission mechanisms 22 are operated to disconnect the driving shaft 21 from the wheels 2, the shaft 21 can be employed for operating various machines or devices, the power being taken from the shaft 21 in any suitable manner.

Fig. 10 illustrates a modification, since the shafts 26 are connected directly to the wheel shafts 11$^a$, by means of worms 27$^a$ secured upon the shafts 26 and meshing with worm wheels 31$^a$ secured upon the shafts 11$^a$. This provides a more direct connection between said shafts.

Having thus described the invention, what is claimed as new is:

1. A tractor having a pair of wheels with channel-shaped rims whose flanges are notched, endless cables trained around said wheels, cross tractor members extending across said cables and having their terminals engageable in the notches, means carried by the tractor members embracing the cables to attach said members thereto, and means for actuating one of said wheels.

2. A tractor having a pair of wheels with channel-shaped rims whose flanges are provided with notches, endless cables trained around said wheels, cross tractor members upon said cables and having bent back portions embracing them, and means for driving one of said wheels, the ends of the tractor members being engageable in said notches.

3. A tractor having a pair of wheels provided with channel-shaped rims whose flanges have notches, endless cables trained around said wheels, cross T-irons upon said cables, the ends of the flanges of said irons being bent back into eyes embracing said cables, and the webs projecting outwardly from the cables to engage the ground, the ends of said irons being engageable in said notches.

In testimony that I claim the foregoing as my own, I have hereto affixed my signature in the presence of two witnesses.

WILLIAM D. WATKINS.

Witnesses:
MARGARET A. CONLEY,
LOUISE I. KNOEPPEL.